United States Patent Office 3,221,881
Patented Dec. 7, 1965

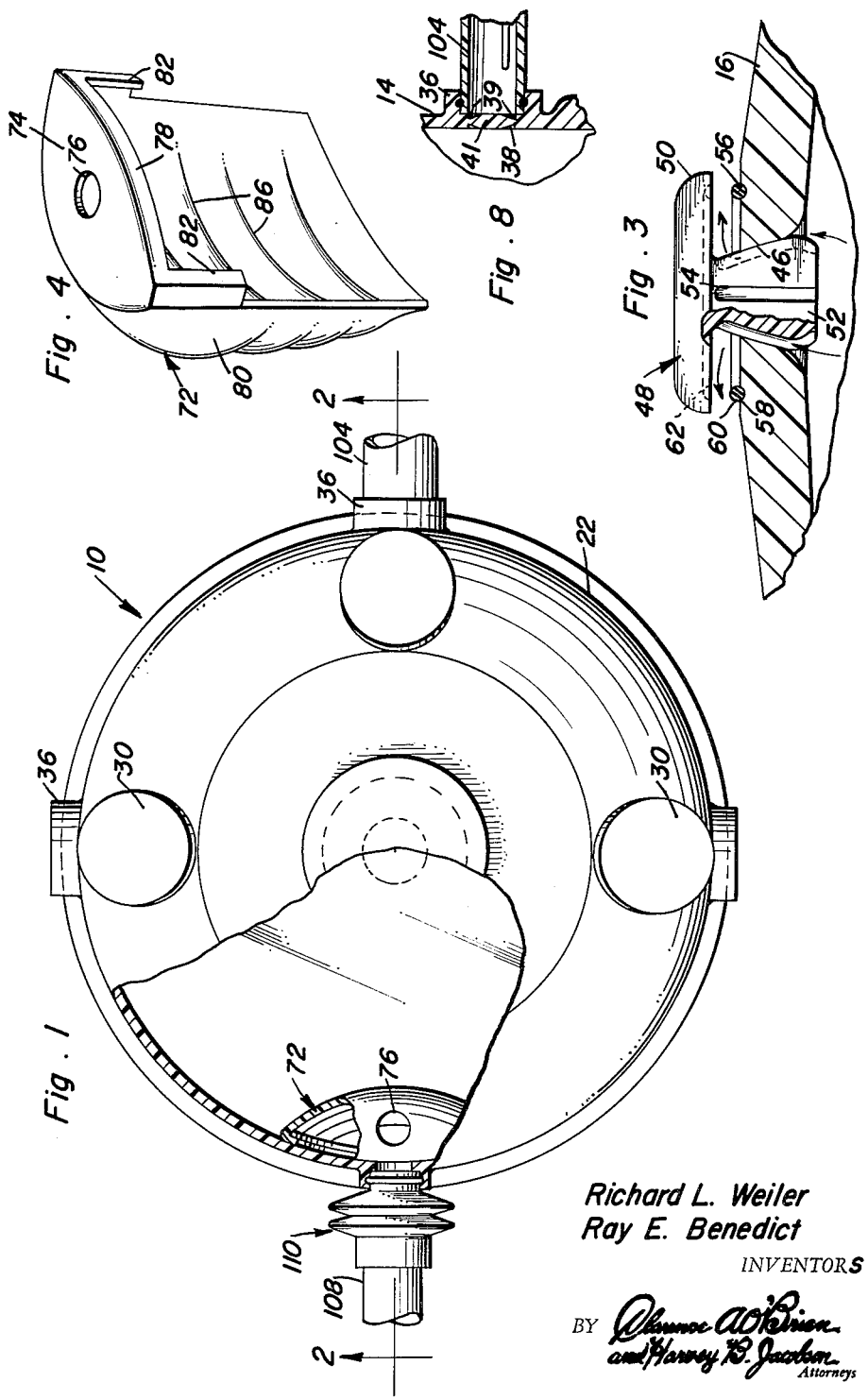

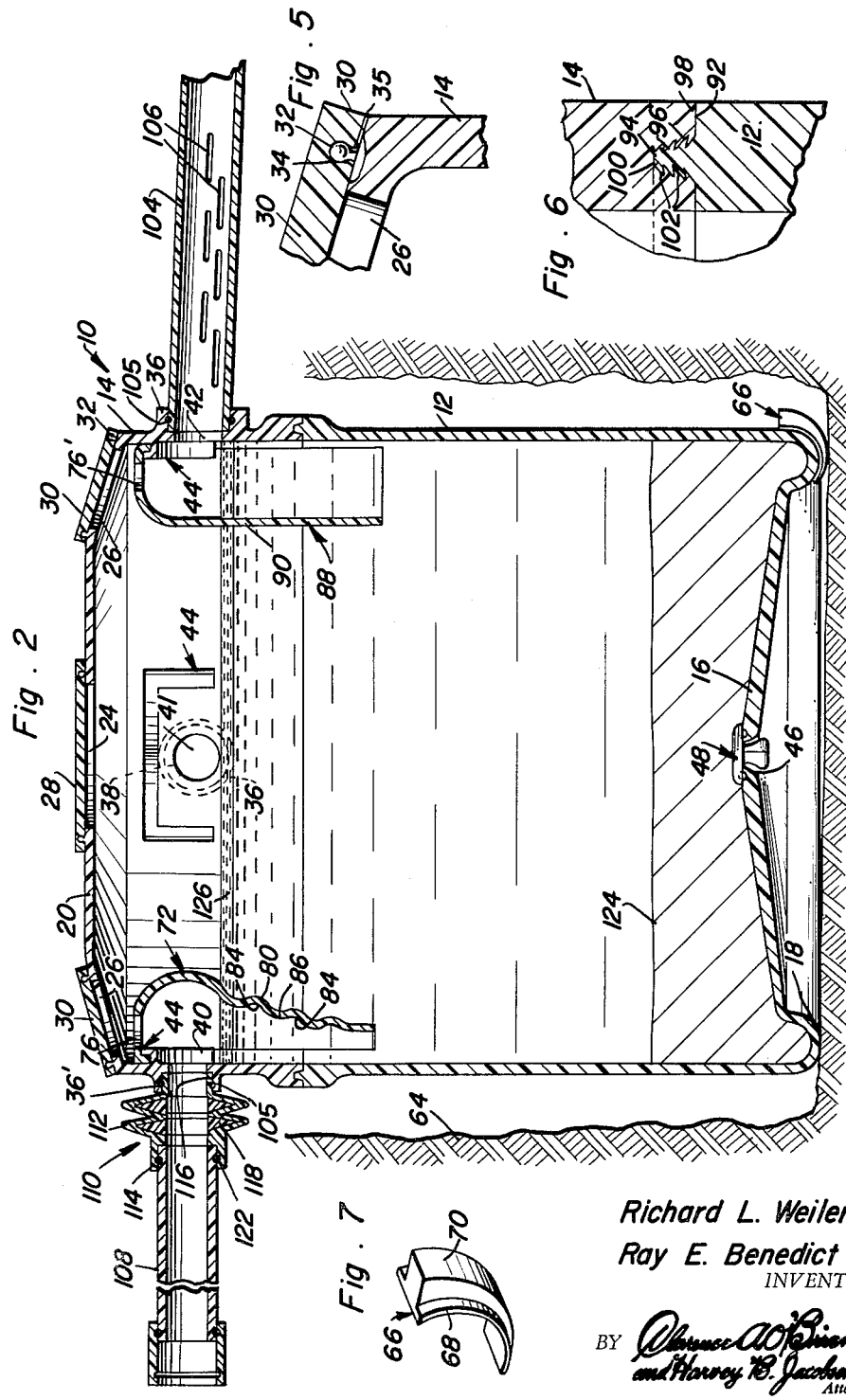

1

3,221,881
GLASS FIBER SEWAGE TANK
Richard L. Weiler, Alma, N.Y., and Ray E. Benedict,
Box 193, Richburg, N.Y.
Filed May 25, 1962, Ser. No. 197,688
3 Claims. (Cl. 210—136)

This invention relates to receptacles, and particularly to an improved sewage or septic tank composed of fiber glass impregnated with resin.

It is now conventional practice to construct sewage or septic tanks from concrete, steel or vitreous clay. However, there are many disadvantages in using these conventional materials for septic tanks. Septic tanks composed of these materials are unusually heavy and therefore expensive and cumbersome to move, transport or install within the ground. Septic tanks composed of concrete or clay are inherently brittle and therefore subject to easy breakage. Steel septic tanks are further unsatisfactory since they are subject to rapid oxidation and chemical corrosion while in use.

Accordingly it is a primary object of this invention to provide a septic tank composed of plastic or resin reinforced fiber glass which is unusually strong, light in weight, and therefore easy and economical to transport and install.

It is another object of the invention to provide a septic tank composed of a material which is generally inert to chemical action and therefore long lasting.

It is another object of the invention to provide a septic tank having smooth inner wall surfaces which remain smooth in use and therefore have little tendency toward accumulating deposits of scum thereon and may be easily cleaned.

It is another object of the invention to provide a septic tank which is economical to manufacture, is durable in use and therefore requires a minimum of maintenance.

It is yet another object of the invention to provide a septic tank composed of several parts which may be connected together to form a leak-proof seal and yet not require any special tools or skill on the part of the operator assembling the tank. The various parts of the tank may be assembled at the site of installation.

It is still another object of the invention to provide a septic tank having an irregular baffle plate which is so designed that it improves and speeds up the chemical decomposition of the solid material in the tank.

It is another object of the invention to provide a septic tank having baffle plates that are removable and may be installed at various locations within the tank.

It is yet another object of the invention to provide a septic tank having novel pipe connections that are flexible in nature and may be installed rapidly without the use of special tools or without necessitating exact alignment of the pipe and the septic tank ports.

It is another object of the invention to provide a septic tank having spaced knockouts so that the inlet and outlet pipes may be connected at various points to the tank or a plurality of outlet pipes or inlet pipes may be used therewith. This eliminates sharp bends in the pipes connected to the tank and results in less clogging of the pipes and permits a more efficient use of the drainage field for the tank. By using a plurality of outlets in a septic tank, the time and expense of installing a separate distribution box is thereby eliminated.

2

It is still another object of the invention to provide a septic tank having a novel check valve in the bottom thereof so as to permit the tank to be easily installed in a hole filled with water.

It is yet another object of the invention to provide a septic tank with a plurality of inspection and cleaning apertures closed by covers removably secured to the tank in sealing relationship in a new and novel manner.

It is yet another object of the invention to provide a septic tank composed of a plurality of sections joined together by novel means.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a plan view of the invention with parts broken away;

FIGURE 2 is an enlarged vertical cross sectional view taken substantially on the plane indicated by line 2—2 of FIGURE 1;

FIGURE 3 is an enlarged vertical cross sectional view of the check valve shown in the bottom of FIGURE 2;

FIGURE 4 is a perspective view of a baffle;

FIGURE 5 is an enlarged vertical cross sectional view showing means for securing covers to the top of the tank;

FIGURE 6 is an enlarged vertical cross sectional view showing the joint between two sections of the tank;

FIGURE 7 is a perspective view of an adjusting wedge; and

FIGURE 8 is a cross sectional view through one of the knockout plugs.

As illustrated in the drawings, the sewage or septic tank 10 comprises a cylindrical bottom portion 12 and a cylindrical top portion 14 concentric with the bottom portion and supported on its upper edge. The bottom portion 12 is provided with a conical floor 16 integrally connected to the bottom edge of the cylindrical portion 12 by means of an annular trough 18 of semi-circular cross section.

The top portion 14 is integrally connected to a flat circular roof 20 by means of a frusto-conical edge 22 of the roof. The center of the roof 20 is provided with a circular opening 24 and the sloping edge portion 22 is provided with four equally spaced circular openings 26. Each of the openings 24 and 26 are provided with a circular cover 28 or 30. As shown in FIGURES 2 and 5, the upper edges of the openings 24 and 26 are provided with sperical knobs 32 integrally connected to the roof by a reduced neck portion. The covers 28 and 30 are provided with corresponding spherical recesses 34 which communicate with the lower surfaces of the covers by tapered bores 35 of smaller diameter than the recesses 34. When the covers are placed over the openings so that the recesses 34 are in alignment with the knobs 32, the knobs snap into the recesses when the covers are forced downwardly whereby the covers are removably secured in sealing engagement with the upper surface of the roof of the cylindrical top portion 14.

Four equally spaced radially projecting annular flanges 36 and 36' are integrally formed on the outer side of the top portion 14 and in vertical alignment with the openings 26. Initially, the top portion 14 is provided with circular molded indentations 38 and 39 concentric with the flanges 36. The indentations 38 and 39 enclose circular knockout plugs 41 as shown in FIGURE 8 for selectively providing apertures in side walls of the portion 14. However, the flange 36' is not provided with a knockout plug since the portion 14 is formed with an inlet opening 40 which is slightly higher in elevation than the plugs 41 and concentric with flange 36'. The knockout plugs are at a lower elevation than the opening 40 so that when they are removed outlet openings are provided such as shown in FIGURE 2, at 42 for draining the tank.

A U-shaped support bracket 44 surrounds each pair of the circular indentations 38 and 39 and opening 40. Each bracket is formed integrally with the inner surface of the cylindrical top portion 14. Each of the brackets 44 is L-shaped in cross section so as to provide a U-shaped recess between each of the brackets and the inner surface of the top portion 14.

The center of the floor 16 has formed therethrough a tapered passage 46 which contains a vertically movable check valve 48. Check valve 48 comprises a circular cap 50 integrally secured to a frusto-conical stem 52 coaxial with the cap and having a plurality of longitudinally extending grooves 54 formed in its outer surface. The top central portion of the floor 16 is provided with a flat circular upper surface 56 which acts as a seat for the cap 50. The seat 56 is provided with a circular recess 58 which is semi-circular in cross section and contains a flexible rubber O-ring 60. The bottom surface of the cap 50 is also provided with a circular recess or groove 62 adapted to receive the upper half of the O-ring 60. Referring to FIGURES 2 and 3, it is apparent that when the valve 48 is in its lowermost position, the recess 62 receives the upper half of the O-ring 60 so as to effectively close the tapered passage 46. However, when a fluid pressure below the valve 48 is greater than the fluid pressure above the valve, the valve is urged upwardly as shown in FIGURE 3 whereupon fluid may pass from below the floor 16, through the grooves 54, between the cap 50 and seat 56, and into the interior of the cylindrical bottom portion 12.

As shown in FIGURE 2, a well 64 has been formed in the ground for the septic tank 10. The cylindrical bottom portion 12 is first inserted within the well 64 and is properly levelled by one or more levelling devices 66. As shown in FIGURE 7, each of the levelling devices 66 comprises a semicircular plate 68 of the same radius as the trough 18 on the bottom of the portion 12. The outer side of the plate 16 is formed integrally with an arcuate wedge-shaped flange 70. By referring to FIGURE 2, it is apparent that as the device 66 is rotated in a clockwise direction about the outer surface of trough 18, one edge of the trough is elevated by the tapered flange 70. Thus, by rotating one or more of the devices 66 about the lowermost edge of the trough 18, the bottom portion 12 may be properly levelled.

When the portion 12 is first installed within the well 64, the portion 12 will tend to float if there is a significant quantity of water within the bottom of the well. However, if there is substantial water in the bottom of the well, the pressure of the water acting on the bottom of the valve 48 will push the valve upwardly to the position illustrated in FIGURE 3 whereupon the water in the bottom of the well may flow into the portion 12 as illustrated by the arrows in FIGURE 3. Once the water in the portion 12 is substantially equal or level with the water in the well, the valve 48 will be closed by gravity or by the pressure of the water in portion 12.

Once the portion 12 is properly positioned and levelled, within the well 64, it may then be closed by securing thereto the top portion 14. However, before the top portion is installed on the bottom portion 12, at least one of the knockout plugs spaced from the inlet opening 40 is removed so as to provide at least one outlet opening 42. As illustrated in the drawings, only one outlet opening 42 has been provided in the upper portion 14, and this outlet opening is diametrically opposite the inlet opening 40. The inlet opening 40 is covered by an inlet baffle 72 which is substantially U-shaped or semicircular in horizontal cross section and has a top 74 provided with an opening 76. The top 74 is provided with a downwardly extending arcuate flange 78 adapted to be received within the upper portion of the recess formed by the U-shaped bracket 44. The vertically extending wall portion 80 of the baffle 72 has upper edges provided with vertically extending flanges 82 which are coplanar and integral with the ends of the flange 78. The flanges 82 are received within the vertically extending leg portions of the grooves defined by the brackets 44, and the flanges 82 in conjunction with the flange 78 form a U-shaped integral flange as shown in FIGURE 4. As shown in FIGURE 2, the baffle 72 is installed on the bracket 44 and wall portion 80 extends downwardly from the top 74 and slopes toward the portion of the cylinder 14 directly below the opening 40. The wall portion 80 is provided with vertically spaced arcuate grooves or channels 84 separated by arcuate ridges 86. Thus, the inner and outer surfaces of the wall portion 80 are undulated or corrugated.

After the inlet baffles have been properly installed, an outlet baffle 88 is installed in the same manner on the support 44 surrounding the outlet openings 42. The outlet baffle 88 is of the same construction as the inlet baffle except that its vertical wall portion 90 is semicircular in cross-section and extends parallel to the vertical sides of the portion 14. The inlet baffle 88 is also provided with an opening 76' in its top.

After the inlet baffles are installed on the top portion 14, the top portion is then installed on the bottom portion 12 as shown in FIGURE 2. The bottom edge of the top portion 14 is provided with a circular groove 94 of generally U-shaped cross-section however, the opposite side walls of the groove 94 are provided with triangular, sawlike teeth or ribs 96 which extend circumferentially around the inner walls of the groove 94. The upper surface 98 of the bottom portion 12 is provided with an integral circular flange 100 whose outer surfaces are provided with a plurality of sawlike teeth or ribs 102 adapted to mate with and extend between the ribs or teeth 96. The cross sectional shape of the flange 100 is exactly the same as the cross sectional shape of the groove 94. Thus, when the top portion 14 is forced down upon the bottom portion 12 as shown in FIGURE 2, the circular flange 100 is forced into the groove 94, thereby spreading the sides of the groove and permitting the teeth 102 and 96 to interlock thereby causing the top and bottom portions of the tank to be securely locked together.

After the top portion 14 is installed, an outlet or a drainage pipe 104 is connected to the flange 36 containing the opening 42. Each flange 36 has an inner groove containing an O-ring seal 105 which snaps within a circular recess in one end of the pipe 104 when the pipe is pushed into the flange. The outlet or drainage pipe 104 is provided with a plurality of slots or drainage ports 106.

An inlet pipe 108 is connected to the inlet flange 36' by means of a flexible pipe joint 110 comprising a flexible fiber glass bellows 112 integrally connected at its ends to annular flanges 114 and 116. The annular V-shaped spaces between the inner surfaces of the walls of the bellows are filled with a resilient filler 118. The annular flanges 114 and 116 are provided with concentric annular grooves semicircular in cross-section which contain an O-ring seal identical to seals 105 that are constructed of butyl rubber. In a similar manner, one end of pipe 108 and the flange 114 are provided with annular grooves semicircular in cross-section which contain a butyl rubber O-ring 122.

In operation, the raw sewage flows through pipe 108, through inlet opening 40 into the upper portion of tank 10. The sewage strikes the vertical wall 80 of the baffle 72 and falls downwardly over the corrugated surfaces of the baffle whereupon bumping of the solid pieces of sewage over the ridges 86 causes these pieces to be broken into small particles. These particles and the other solid portions of the sewage settle by gravity to the bottom of the tank to form a sludge 124. The sludge 124 is decomposed over a period of time by bacteria to form a liquid 126 and eventually is forced through the outlet baffle 88, outlet opening 42 and into the drain pipes 104 which are normally a foot or so below the surface of the ground. The decomposed sewage then passes through the openings 106 in the pipes 104 whereupon it is absorbed into the earth.

The covers 30 are directly over the openings 76 and 76' in the baffles whereupon removal of these covers permits the baffle to be inspected, repaired or cleaned. Removal of the central cover 28 permits the sludge or liquid to be pumped from the tank and also permits access to the interior thereof for other purposes.

Depending on the relative locations of the inlet pipe 108 and the drain field for the septic tank, any one of the annular flanges 36 or a plurality of these flanges may be connected to the outlet pipes 104.

Since the septic tank 10 is composed of fiber glass impregnated with resin, it is of light weight, very strong, highly flexible and easy to repair. This permits the tank to be easily transported, easily installed, and substantially eliminates all maintenance, since the tank is corrosion-proof. The flexible pipe joint 110 permits misalignment between the pipe 108 and the flange 36' thereby simplifying the installation of the pipe.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A sewage tank comprising a hollow container enclosing a fluid chamber and composed of fiber glass reinforced waterproof resin material, said container including a top portion, the top portion including a roof, and a bottom portion, spaced inlet and outlet passage means formed in said top portion below the roof, said top portion and said bottom portion having abutting edges connected together by interlocking means, said interlocking means comprising a flange on one of the edges fitting within a groove in the other edge, said flange and groove having internesting teeth, said outlet passage means including circular indentations defining knockout plugs, said inlet passage means including a hollow flexible bellows adapted to be connected to an inlet pipe, said inlet and outlet passage means including ports through the side of said container, vertically extending semicircular baffles within said chamber and extending over one end of each of said ports, the baffle over the inlet passage means being corrugated so as to break up solid pieces of sewage into small particles.

2. A sewage tank comprising a hollow container enclosing a fluid chamber and composed of fiber glass reinforced waterproof resin material, said container including a top portion, the top portion including a roof, and a bottom portion, spaced inlet and outlet passage means formed in said top portion below the roof, said top portion and said bottom portion having abutting edges connected together by interlocking means, said interlocking means comprising a flange on one of the edges fitting within a groove in the other edge, said flange and groove having internesting teeth, said outlet passage means including circular indentations defining knockout plugs, said inlet passage means including a hollow flexible bellows adapted to be connected to an inlet pipe, said inlet and outlet passage means including ports through the side of said container, vertically extending semicircular baffles within said chamber and extending over one end of each of said ports, the baffle over the inlet passage means being corrugated so as to break up solid pieces of sewage into small particles, a circular trough around the bottom of the tank, arcuate levelling wedges slidably engaging the bottom of said trough, said bottom portion having a floor, a fluid pressure operated check valve in said floor for admitting fluid upwardly through the floor, a plurality of openings in said roof, covers over said openings, snap fastener means detachably securing said covers to said roof in closing relation to the openings.

3. A septic tank assembly comprising a tank including a peripheral wall, a bottom and a top wall being constructed of a chemically inert anticorrosive resin plastic reinforced with glass fibers for forming a rigid and lightweight tank, the bottom of said tank being connected with the peripheral wall thereof by a continuous upwardly opening annular trough thereby defining a supporting edge for the tank, the peripheral wall of said tank including at least one inlet passage means defined by a radially projecting flange and at least one outlet passage means defined by a radially outwardly projecting flange, said outlet passage means including a knock-out plug for enabling the outlet passage means to be rendered operative, said inlet passage means being disposed at a slightly higher elevation than the outlet passage means for assuring discharge of effluent to the outlet passage means, said top of the tank having at least one opening therein, a cover plate for said opening, and means interconnecting the top around the periphery of the opening and the cover therefor for releasably securing the cover in place for closing the opening, said flanges, cover and securing means all being constructed of glass fiber reinforced resin plastic, said inlet passage means being provided with a baffle means disposed interiorly thereof, said outlet passage means including a baffle means disposed interiorly thereof, means detachably supporting the baffle means for the inlet passage means from the interior of the peripheral wall of the tank, means detachably supporting the baffle means for the outlet passage means from the interior of the peripheral wall of the tank, said baffle means each including an arcuate member spaced from the peripheral wall of the tank and being constructed of glass fiber reinforced resin plastic material, said top being provided with an opening aligned with the inlet passage means and an opening aligned with the outlet passage means for providing access to the passage means and to the baffle means for inspection and cleaning thereof, covers for each of said openings, and snap fastening means for retaining each of the covers in closed relationship to the opening which it closes, said covers being constructed of glass fiber reinforced resin plastic material, said bottom of the tank including a check valve disposed inwardly of the trough, said check valve being operative to admit fluid from the exterior surface of the bottom into the interior of the tank thereby enabling the tank to be inserted into a recess having water or the like therein whereby such water will pass through the bottom of the tank into the interior of the tank so that the tank may be supported from a supporting surface without it floating on the water, said check valve including a circular disk on the upper end thereof for engaging the bottom for closing the opening receiving the check valve when there is no pressure on the exterior surface of the bottom, said means for supporting the baffle means including an upwardly extending hook-shaped member integral with the inner surface of the tank wall, said baffle means including a depending hook-shaped element interengaging the flange on the wall of the tank.

(References on following page)

References Cited by the Examiner

UNITED STATES PATENTS

| | | | |
|---|---|---|---|
| 2,076,380 | 4/1937 | Marsh | 210—532 |
| 2,463,754 | 3/1949 | Deters | 45—139 |
| 2,641,486 | 6/1953 | Vance | 285—226 X |
| 2,792,125 | 5/1957 | Gallacher | 210—532 X |
| 2,857,054 | 10/1958 | Sitton. | |
| 2,909,198 | 10/1959 | Kramer et al. | 285—226 X |
| 3,059,243 | 10/1962 | Ross et al. | 210—169 X |
| 3,079,037 | 2/1963 | Schechter | 220—60 |
| 3,079,038 | 2/1963 | Rossi et al. | 220—83 |
| 3,097,166 | 7/1963 | Monson | 210—532 X |
| 3,111,153 | 11/1963 | Sonka et al. | 220—60 X |

FOREIGN PATENTS

| | | |
|---|---|---|
| 1,010,254 | 6/1957 | Germany. |
| 14,761 | 1888 | Great Britain. |
| 17,899 | 1910 | Great Britain. |
| 720,986 | 12/1954 | Great Britain. |
| 811,433 | 4/1959 | Great Britain. |

OTHER REFERENCES

"Philip Sitton Septic Tank," Philip Sitton Septic Tank Co., Copyright 1952 page 9.

REUBEN FRIEDMAN, *Primary Examiner.*

HERBERT L. MARTIN, *Examiner.*